United States Patent
Kim et al.

(10) Patent No.: US 8,873,138 B2
(45) Date of Patent: Oct. 28, 2014

(54) AUTO FOCUSING DEVICES FOR OPTICAL MICROSCOPES

(75) Inventors: Kwang Soo Kim, Suwon-si (KR); Chang Hoon Choi, Suwon-si (KR); In Ho Seo, Daejeon (KR); Hyun Jae Lee, Suwon-si (KR); Myoung Ki Ahn, Cheonan-si (KR); Byeong Hwan Jeon, Yongin-si (KR); Sung Jin Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 227 days.

(21) Appl. No.: 13/608,404

(22) Filed: Sep. 10, 2012

(65) Prior Publication Data

US 2013/0070334 A1    Mar. 21, 2013

(30) Foreign Application Priority Data

Sep. 19, 2011    (KR) .......................... 10-2011-0094318

(51) Int. Cl.
| | |
|---|---|
| *G02B 21/00* | (2006.01) |
| *G02B 27/14* | (2006.01) |
| *G02B 7/38* | (2006.01) |
| *G02B 21/24* | (2006.01) |
| *G02B 27/10* | (2006.01) |

(52) U.S. Cl.
CPC .............. *G02B 21/245* (2013.01); *G02B 27/14* (2013.01); *G02B 7/38* (2013.01); *G02B 27/106* (2013.01)
USPC .......................................... 359/379; 359/383

(58) Field of Classification Search
USPC .................................................. 359/379–383
See application file for complete search history.

(56) References Cited

U.S. PATENT DOCUMENTS

| | | | | |
|---|---|---|---|---|
| 4,972,258 | A * | 11/1990 | Wolf et al. ....................... | 348/79 |
| 5,801,881 | A * | 9/1998 | Lanni et al. .................... | 359/386 |
| 7,550,699 | B1 * | 6/2009 | Marshall .................... | 250/201.4 |
| 7,583,380 | B2 | 9/2009 | Van Beek et al. | |

FOREIGN PATENT DOCUMENTS

| | | |
|---|---|---|
| JP | 2007-218678 A | 8/2007 |
| JP | 2008-502898 A | 1/2008 |

* cited by examiner

*Primary Examiner* — Frank Font
(74) *Attorney, Agent, or Firm* — Harness, Dickey & Pierce, PLC

(57) ABSTRACT

A focusing device for an optical microscope may include a light emitting unit configured to emit laser light having a specific wavelength, a wedge mirror configured to enable the emitted laser light to be incident on a plurality of locations of a surface of a specimen, first and second light receiving units configured to detect an amount of laser light reflected from the surface of the specimen, a spatial filter configured to eliminate out-of-focus light from light beams reflected from the surface of the specimen and to detect an amount of in-focus light, and a control unit configured to generate a control signal used to carry out focus adjustment of the optical microscope using a plurality of light-amount information detected by the first and second light receiving units and the spatial filter.

10 Claims, 11 Drawing Sheets

FIG. 4
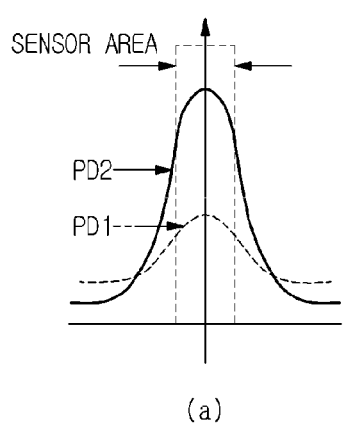
(a)
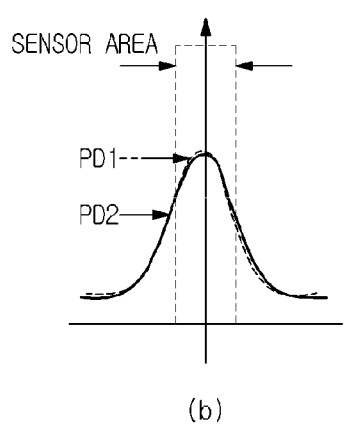
(b)
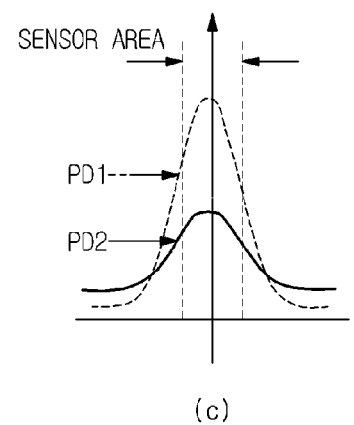
(c)

AUTO FOCUSING DEVICES FOR OPTICAL MICROSCOPES

CROSS-REFERENCE TO RELATED APPLICATION(S)

This application claims priority from Korean Patent Application No. 2011-0094318, filed on Sep. 19, 2011, in the Korean Intellectual Property Office (KIPO), the entire contents of which are incorporated herein by reference.

BACKGROUND

1. Field

Example embodiments may relate to focusing devices that may adjust focus of optical microscopes using laser scanning. Example embodiments may relate to focusing devices that may automatically adjust focus of optical microscopes using laser scanning.

2. Description of Related Art

A semiconductor device is manufactured by repeatedly performing unit processes such as deposition, photolithography, etching, cleaning, testing, etc., on a surface of a wafer made of a semiconductor material such as silicon. Recently, there is a demand for high integration and high performance of the semiconductor device. To this end, individual semiconductor-manufacturing unit processes must be developed to enable a semiconductor device to have a fine feature size and high performance while maintaining a yield of the semiconductor device.

One factor to reduce the yield of the semiconductor device may be wafer defects. For example, the defects may include scratches and/or particles formed at a thin film on the wafer, excessively-removed portions or non-removed portions of the thin film on the wafer, and/or pitting formed at the surface of the wafer, or the like. In particular, as the integration of the semiconductor device becomes higher, even micro-defects may lead to a serious malfunction of the semiconductor device, which otherwise and previously, may not adversely affect an operation or function of the semiconductor device. For this reason, there exists a need not only to reduce the defects formed in manufacturing the semiconductor device, but also to rapidly and accurately measure and test the defects formed on/at the wafer at a test process after each of the unit processes has been finished.

Image information acquired by an optical microscope, etc., may be used to detect the defects formed in manufacturing the semiconductor device or flat panel display (FPD). The image information must have a high magnification and high resolution in order to improve the accuracy of the defect detection. It may be important to acquire clear image information of a pattern of a substrate (for example, the wafer or liquid crystal display (LCD) panel) by accurately detecting a focal point of the optical microscope. Moreover, a fast focus detection and/or adjustment may be required to be suitable for a fast test process.

SUMMARY

Example embodiments may provide focusing devices for optical microscopes capable of laser-scanning an entirety of specimens to be tested using a wedge mirror. Example embodiments may provide focusing devices that may automatically adjust focus. Example embodiments may provide accurate movement of a specimen and/or objective lens to a focal point. Example embodiments may provide a rotatable wedge mirror.

Example embodiments may provide focusing devices for optical microscopes capable of accurately moving a specimen and/or objective lens to a focal point when measuring and testing the specimen (for example, an LCD panel) made of a transparent material and having a small thickness, by using a confocal-type light receiving unit added to the focusing device for optical microscopes using laser scanning.

Example embodiments may provide focusing devices for optical microscopes capable of shortening focus adjustment durations (or improving focusing speeds) by using a combination of laser scanning and confocal-type mechanism, compared to the case when using only the confocal-type mechanism.

In some example embodiments, a focusing device for an optical microscope may include a light emitting unit configured to emit laser light having a specific wavelength; a wedge mirror configured to enable the emitted laser light to be incident on a plurality of locations of a surface of a specimen; first and second light receiving units configured to detect an amount of laser light reflected from the surface of the specimen; a spatial filter configured to eliminate out-of-focus light from light beams reflected from the surface of the specimen and to detect an amount of in-focus light; and/or a control unit configured to generate a control signal used to carry out focus adjustment of the optical microscope using a plurality of light-amount information detected by the first and second light receiving units and the spatial filter.

In some example embodiments, the spatial filter may include a light splitter configured to transmit some light reflected from the surface of the specimen and to reflect a remainder of the light reflected from the surface of the specimen; a pin hole member having a pin hole formed in the pin hole member; a condenser lens on an optical path between the light splitter and the pin hole member, the condenser lens configured to condense the light reflected from the light splitter to the pin hole so that the in-focus light is extracted; and/or a third light receiving unit configured to detect an amount of light incident on the third light receiving unit through the pin hole.

In some example embodiments, the light emitting unit may include a laser diode.

In some example embodiments, the focusing device may further include a collimating lens configured to enable beams of light emitted from the light emitting unit to be parallel to each other.

In some example embodiments, the focusing device may further include a half mirror between the wedge mirror and the collimating lens. The half mirror may be configured to transmit some light passing through the collimating lens and incident on the half mirror; transmit some light reflected from the wedge mirror and incident on the half mirror; reflect a remainder of the light passing through the collimating lens and incident on the half mirror; and/or reflect a remainder of the light reflected from the wedge mirror and incident on the half mirror.

In some example embodiments, each of the first, second, and third light receiving units may include a photodiode.

In some example embodiments, the control unit may be configured to carry out focus adjustment of the optical microscope by moving the specimen, an objective lens of the optical microscope, or an entirety of the optical microscope in an optical axis direction.

In some example embodiments, the focusing device may further include an actuator driver configured to receive the control signal from the control unit and to control, in response to the control signal, an operation of an actuator coupled to the specimen, the objective lens, or a body of the optical microscope so as to move the specimen, the objective lens of the optical microscope, or the entirety of the optical microscope in the optical axis direction.

In some example embodiments, the control unit may be configured to calculate a focus error (FE) value using light-amount information (PD1) detected by the first light receiving unit, light-amount information (PD2) detected by the second light receiving unit, and a mathematical expression FE=(PD2−PD1)/(PD2+PD1). The control unit may be configured to determine a movement direction of the specimen, the objective lens, or the entirety of the optical microscope to achieve a focus match based on the calculated focus error value.

In some example embodiments, the control unit may be configured to receive light-amount information from the third light receiving unit while moving the specimen, the objective lens, or the entirety of the optical microscope in the determined movement direction, and wherein when the specimen, the objective lens, or the entirety of the optical microscope reaches a position in the optical axis direction corresponding to a peak of the light-amount information received from the third light receiving unit, the control unit may be configured to stop the specimen, the objective lens, or the entirety of the optical microscope.

In some example embodiments, the control unit may be configured to rotate so as to enable the emitted laser light to be incident on the plurality of locations of the surface of the specimen.

In some example embodiments, the control unit may be configured to carry out focus adjustment of the optical microscope by moving the specimen, an objective lens of the optical microscope, or an entirety of the optical microscope in an optical axis direction.

In some example embodiments, the focusing device may further include an actuator driver configured to receive the control signal from the control unit and to control, in response to the control signal, an operation of an actuator coupled to the specimen, the objective lens, or a body of the optical microscope so as to move the specimen, the objective lens of the optical microscope, or the entirety of the optical microscope in the optical axis direction.

In some example embodiments, one or both of the first and second light receiving units may include a photodiode.

In some example embodiments, the third light receiving unit may include a photodiode.

In some example embodiments, a focusing device for an optical microscope may include a light emitting unit; a half mirror; a wedge mirror; first and second light receiving units; and/or a control unit. The light emitting unit may be configured to emit laser light having a specific wavelength. The wedge mirror may be configured to enable the emitted laser light to be incident on a specimen. The half mirror may be configured to transmit some light reflected from the wedge mirror and incident on the half mirror, and/or to reflect a remainder of the light reflected from the wedge mirror and incident on the half mirror. The first and second light receiving units may be configured to detect an amount of laser light reflected from the specimen. The control unit may be configured to carry out focus adjustment of the optical microscope using light-amount information detected by the first and second light receiving units.

In some example embodiments, the focusing device may further include a collimating lens configured to enable beams of light emitted from the light emitting unit to be parallel to each other.

In some example embodiments, the half mirror may be further configured to transmit some light passing through the collimating lens and incident on the half mirror, and/or to reflect a remainder of the light passing through the collimating lens and incident on the half mirror.

In some example embodiments, the focusing device may further include a light splitter configured to direct light from the half mirror to the first and second light receiving units.

In some example embodiments, the focusing device may further include a first condenser lens on an optical path between the light splitter and the first light receiving unit; and/or a second condenser lens on an optical path between the light splitter and the second light receiving unit.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 4 is a graph illustrating how to determine focus match or mismatch using light-amount detection signals from the light receiving units in the focus detection unit;

DETAILED DESCRIPTION

Figure 1:
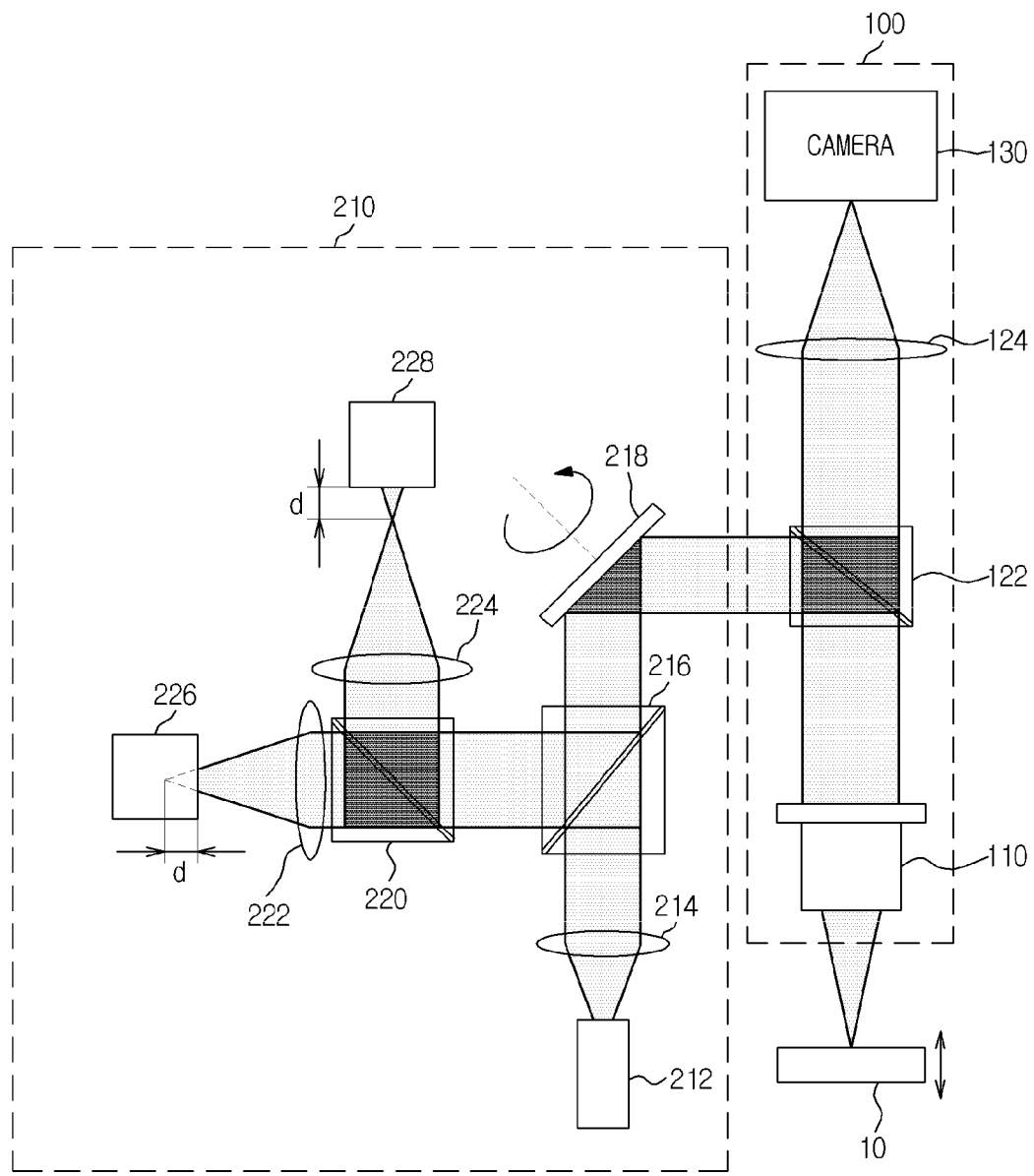
FIG. 1 illustrates an optical system configuration of a focus detection unit in an auto focusing device for an optical microscope using laser scanning.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 illustrates an optical system configuration of a focus detection unit in an auto focusing device for an optical microscope using laser scanning.

More specifically, FIG. 1 illustrates an optical system configuration of the optical microscope 100 and an optical system configuration of the focus detection unit 210 in an auto focusing device for the optical microscope 100 using laser scanning.

As shown in FIG. 1, the optical microscope 100 generally includes an objective lens 110, a light splitter 122, a condenser lens 124, a camera 130, and/or an illumination unit (not shown). The configuration of the illumination unit is not shown in order to focus on the configuration of the focus detection unit 210.

The objective lens 110 receives light reflected from a specimen 10. A ratio of focal lengths between the objective lens 110 and the condenser lens 124 may determine a magnification. Depending on a type of the objective lens 110, there may be determined a maximum angle and amount of light which the objective lens 110 receives from the specimen 10.

The light splitter 122 receives light from the focus detection unit 210 and transfers the same to the specimen 10.

The condenser lens 124 serves to condense light passing through the objective lens 110 and incident thereon to a sensor unit (not shown) of the camera 130, so that an image of the specimen 10 is formed on the sensor unit of the camera 130.

The camera 130 converts image information of the specimen 10 formed on the sensor unit thereof into an electrical signal which in turn is displayed through an image output device. The camera may employ a charge-coupled device (CCD) sensor, a complimentary metal-oxide-semiconductor (CMOS) sensor, or the like.

As shown in FIG. 1, the focus detection unit 210 in the auto focusing device for the optical microscope 100 using laser scanning may include a light emitting unit 212, a collimating lens 214, a half mirror 216, a wedge mirror 218, a light splitter 220, a first condenser lens 222, a second condenser lens 224, a first light receiving unit 226, and/or a second light receiving unit 228.

The light emitting unit 212 emits light having a specific wavelength and may employ a laser diode (LD). However, example embodiments are not limited to laser diodes. Any device may be employed as the light emitting unit as long as the device emits light of a single color.

The collimating lens 214 may cause beams of light emitted from the light emitting unit 212 to be parallel with each other.

The half mirror 216 transmits some of light passing through the collimating lens 214 and incident thereon and reflects the remainder of light passing through the collimating lens 214 and incident thereon. The half mirror 216 transmits some of light reflected from the wedge mirror 218 and incident thereon and reflects the remainder of light reflected from the wedge mirror 218 and incident thereon.

The wedge mirror 218 reflects laser light emitted from the light emitting unit 212 so as to be incident upon the optical microscope 100 and again reflects light reflected from the light splitter 122 of the optical microscope 100 so as to be incident upon the half mirror 216.

The light splitter 220 transmits some of light reflected from the wedge mirror 218 and half mirror 216 and incident thereon so as to be incident upon the first light receiving unit 226. The light splitter 220 reflects the remainder of light reflected from the wedge mirror 218 and half mirror 216 and incident thereon so as to be incident upon the second light receiving unit 228.

The first condenser lens 222 condenses light passing through the light splitter 220 and incident thereon to one point of the first light receiving unit 226. The second condenser lens 224 condenses light reflected from the light splitter 220 and incident thereon to one point of the second light receiving unit 228.

The first and second light receiving units 226 and 228 detect the amount of laser light which is emitted from the light emitting unit 212 and then reaches and reflects from the specimen 10. The first and second light receiving units 226 and 228 may employ photo diodes (PD). However, example embodiments are not limited to photo diodes. Any device, including an avalanche photo diode (APD) or a photo multiplier tube (PMT), may be employed as the light receiving unit as long as the device receives light and detects the amount of the light.

Herein, a situation in which a focal point is formed exactly at the specimen is referred to as "focus match", whereas a situation in which a focal point is not formed exactly at the specimen is referred to as "focus mismatch". When adjusting a focus of the optical microscope by using a focusing device for the optical microscope using laser scanning, the focus match or mismatch may be determined based on amounts of reflected light detected by the first and second light receiving units 226 and 228. This will be described in detail with reference to FIG. 3 and FIG. 4.

Now, a path of light between the optical microscope 100 and the focus detection unit 210 in the focusing device for the optical microscope using laser scanning will be described with reference to FIG. 1.

As shown in FIG. 1, laser light emitted from the light emitting unit 212 is reflected by the wedge mirror 218 (that may be rotatable) so as to be incident upon the optical microscope 100. Then, light reflects from the light splitter 122 of the optical microscope 100 and then passes through the objective lens 110 and reaches and reflects from the surface of the specimen 10. Light reflected from the surface of the specimen 10 again passes through the objective lens 110 and then reflects from the light splitter 122 and then again reflects from the wedge mirror 218. Light reflected from the wedge mirror 218 reflects from the half mirror 216 and is incident upon the first and second light receiving units 226 and 228. At this time, the focus match or mismatch may be determined by analyzing amounts of light incident upon the first and second light receiving units 226 and 228. The first and second light receiving units 226 and 228 are displaced by a distance d from focal points formed by the first and second condenser lenses 222 and 224 respectively. That is, as shown in FIG. 1, the first light receiving unit 226 is displaced forward by the distance d from a focal point formed by the first condenser lens while the second light receiving unit 228 is displaced backward by the distance d from a focal point formed by the second condenser lens. Therefore, when the focal point of laser light is formed at the specimen 10, the focal points formed by the first and second condenser lenses 222 and 224 respectively are distant by exactly the same distance from the first and second light receiving units 226 and 228 respectively. Thus, the amount of light detected by the first light receiving unit 226 is equal to the amount of light detected by the second light receiving unit 228.

Figure 2:
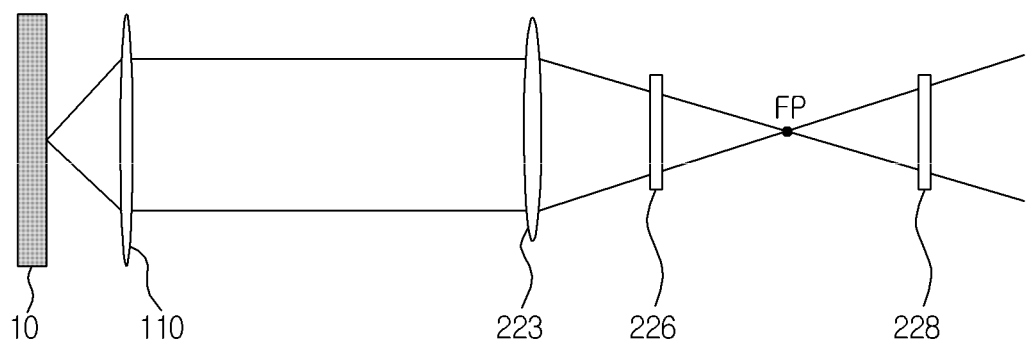
FIG. 2 illustrates an equivalent model of light receiving units in the focus detection unit and a focal point when measuring and testing a specimen made of opaque material.

FIG. 2 illustrates an equivalent model of the light receiving units in the focus detection unit and a focal point when measuring and testing the specimen made of an opaque material.

As mentioned above, when the focal point of laser light is formed at the specimen 10, the focal points of laser light formed by the first and second condenser lenses 222 and 224 respectively are positioned by exactly the same distance from the first and second light receiving units 226 and 228 respectively. Thus, this will be equivalent to the model shown in FIG. 2.

In a situation in which the focal point of laser light is formed at the specimen 10 when measuring and testing the specimen (for example, a silicon wafer) made of an opaque material, a combination of the focus detection unit 210 and a portion of the optical microscope 100 shown in FIG. 1 may be equivalent to a model shown in FIG. 2 where laser light which reaches the specimen 10 and reflects from the surface of the specimen 10 and passes through the objective lens 110 is condensed by a condenser lens 223 so that a focal point FP of laser light is formed at an exactly central position between the first and second light receiving units 226 and 228.

When displacing the specimen 10 from the focal point of laser light (including + directional and − directional displacements), either the amount of laser light detected by the first light receiving unit 226 (hereinafter, referred to as 'PD1') or the amount of laser light detected by the second light receiving unit 228 (hereinafter, referred to as 'PD2') increases. Thus, an absolute value of a difference (PD2−PD1) increases.

Figure 3:
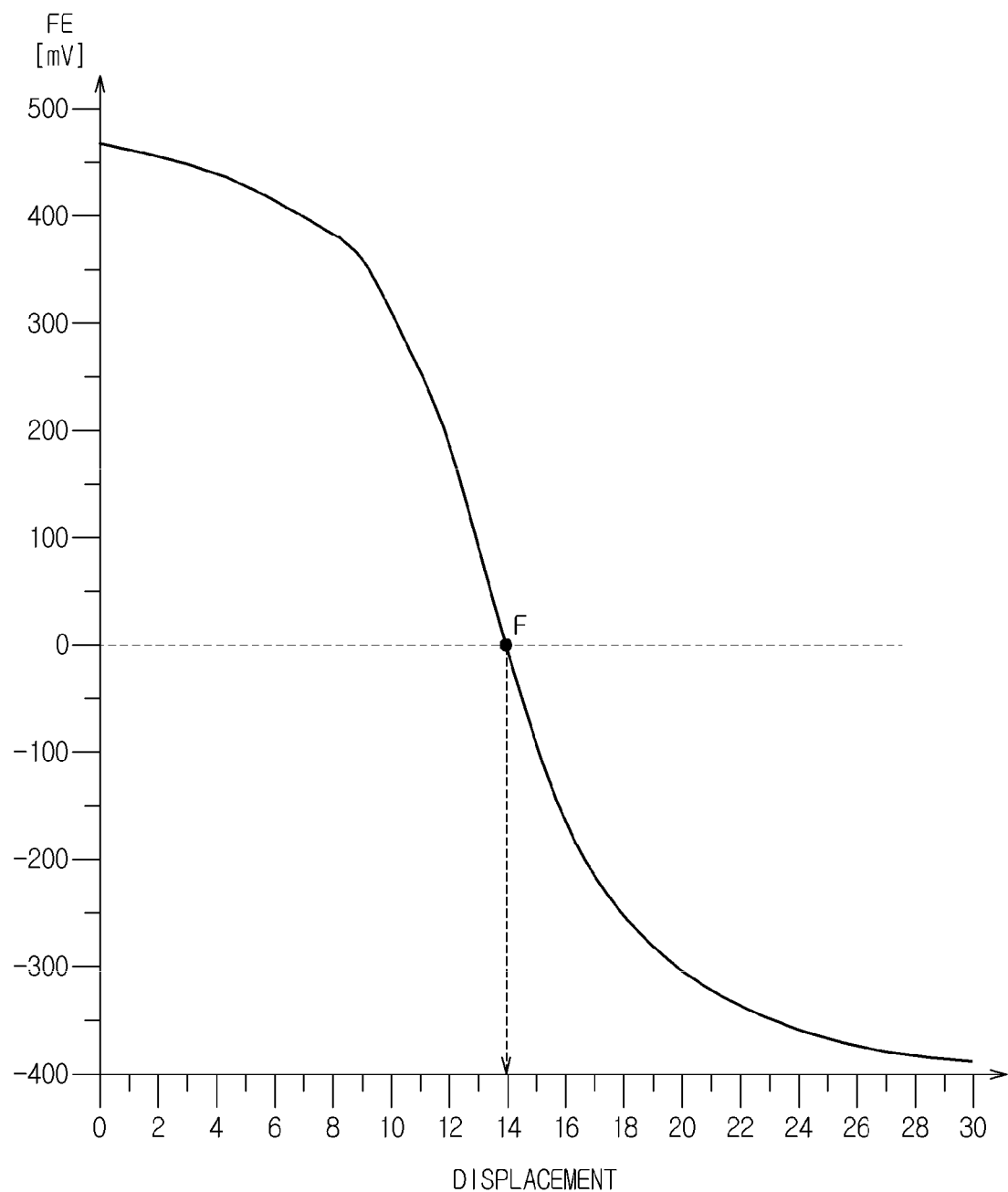
FIG. 3 is a graph illustrating a relationship between a focus error (FE) and a focal point displacement using light-amount detection signals from the light receiving units in the focus detection unit.

This becomes apparent from a graph illustrated in FIG. 3.

FIG. 3 is a graph illustrating a relationship between a focus error (FE) and a focal point displacement using light-amount detection signals from the light receiving units in the focus detection unit.

In FIG. 3, a solid line indicates a focus error signal. The focus error (FE) is calculated using the following equation 1.

$$FE=(PD2-PD1)/(PD2+PD1) \quad\quad\quad Eq\ (1)$$

The above equation 1 means the difference in detected light amount between the first and second light receiving units 226 and 228. In particular, in order to normalize the difference, the difference is divided by the sum of the detected light amounts of the first and second light receiving units 226 and 228.

Hereinafter, referring to FIG. 3 and FIG. 4, there will be described how to determine focus match or mismatch using amounts of reflected light detected by the first and second light receiving units 226 and 228.

When, as shown in (a) of FIG. 4, the amount (PD2) of reflected light detected by the second light receiving unit 228 is larger than the amount (PD1) of reflected light detected by the first light receiving unit 226, that is, the focus error (FE) value is greater than zero, focus adjustment is carried out using a left curve pattern with regard to a focus F in a graph of FIG. 3. In the graph of FIG. 3, a displacement when a focal point of laser light is formed at the specimen 10 becomes approximately 14. When reading the displacement corresponding to the left curve pattern with regard to the focus F in the graph of FIG. 3, the displacement or position of the specimen 10 is lower than the displacement or position of the specimen 10 when the focal point of laser light is exactly formed at the specimen 10. Thus, in this case, the specimen 10 is located below a position or displacement of the focus F. Accordingly, to carry out the focus adjustment using the left curve pattern with regard to the focus F in the graph of FIG. 3 may mean to carry out the focus adjustment while moving the specimen upwards.

Meanwhile, when, as shown in (b) of FIG. 4, the amount (PD2) of reflected light detected by the second light receiving unit 228 is equal to the amount (PD1) of reflected light detected by the first light receiving unit 226, that is, the focus error (FE) value is zero, it is determined that the specimen 10 is located exactly at the focus F of laser light, that is, a focus match is achieved.

When, as shown in (c) of FIG. 4, the amount (PD2) of reflected light detected by the second light receiving unit 228 is smaller than the amount (PD1) of reflected light detected by the first light receiving unit 226, that is, the focus error (FE) value is belowless than zero, focus adjustment is carried out using a right curve pattern with regard to the focus F in the graph of FIG. 3. In the graph of FIG. 3, a displacement when a focal point of laser light is formed at the specimen 10 becomes approximately 14. When reading the displacement corresponding to the right curve pattern with regard to the focus F in the graph of FIG. 3, the position or displacement of the specimen 10 is higher than the position or displacement of the specimen 10 when the focal point of laser light is exactly formed at the specimen 10. Thus, in this case, the specimen 10 is located above a position or displacement of the focus F. Accordingly, to carry out the focus adjustment using the right curve pattern with regard to the focus F in the graph of FIG. 3 may mean carrying out focus adjustment while moving the specimen downwards.

When measuring and testing the specimen (for example, a silicon wafer) made of an opaque material, the focus adjustment may be carried out rapidly and accurately by using the focusing device for the optical microscope using laser scanning as described above with reference to FIG. 1 to FIG. 4.

However, when the focus adjustment is carried out by using the focusing device for the optical microscope using laser scanning as described above in measuring and testing the specimen (for example, an LCD panel) made of a transparent material and having a small thickness (for example, 450 μm or 700 μm), an unclear focal point is formed during focus adjustment of the optical microscope using the objective lens 110 having a specific magnification (for example, equal to or smaller than 10). This is because laser light reflects from upper and lower surfaces of the transparent specimen 10 and then both of a light beam reflected from the upper surface and a light beam reflected from the lower surface are incident upon the first and second light receiving units 226 and 228, so that two focal points of the laser light are formed by the first and second condenser lenses 222 and 224 and are positioned between the first and second light receiving units 226 and 228.

Figure 5:
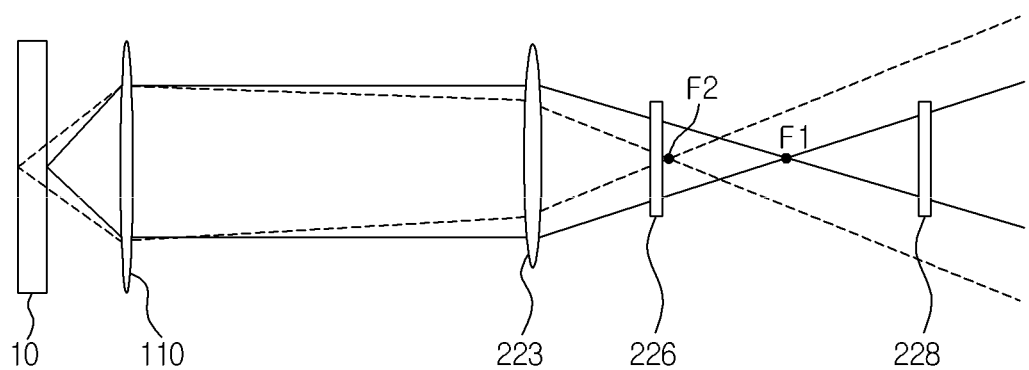
FIG. 5 illustrates an equivalent model of the light receiving units in the focus detection unit and a focal point when measuring and testing a specimen made of transparent material.

FIG. 5 illustrates an equivalent model of the light receiving units in the focus detection unit and a focal point when measuring and testing the specimen made of a transparent material.

FIG. 5 illustrates how two respective focal points for the light beam reflected from the upper surface of the specimen 10 and the light beam reflected from the lower surface of the specimen 10 are formed near the first and second light receiving units 226 and 228. In FIG. 5, a solid line indicates the laser light beam reflected from the upper surface of the transparent specimen 10, while a dotted line indicates the laser light beam reflected from the lower surface of the transparent specimen 10. As shown in FIG. 5, the two respective focal points F1 and F2 for the two beams of reflected light are formed by the condenser lens 223 and are positioned between the first and second light receiving units 226 and 228. Provided that a laser light beam reflected from the lower surface of the transparent specimen 10 is not present and a laser light beam reflected from the upper surface of the transparent specimen 10 is a light reflecting beam from a surface at which a focal point should actually be formed, the amount (PD1) of reflected light detected by the first light receiving unit 226 is equal to the amount (PD2) of reflected light detected by the second light receiving unit 228 because the focal point F1 for light reflected from the upper surface of the transparent specimen 10 is formed at a central position between the first and second light receiving units 226 and 228. However, because the focal point F2 for light reflected from the lower surface of the transparent specimen 10 is formed near the first light receiving unit 226 as shown in FIG. 5, the amount (PD1) of reflected light detected by the first light receiving unit 226 is not equal to the amount (PD2) of reflected light detected by the second light receiving unit 228.

Figure 6:
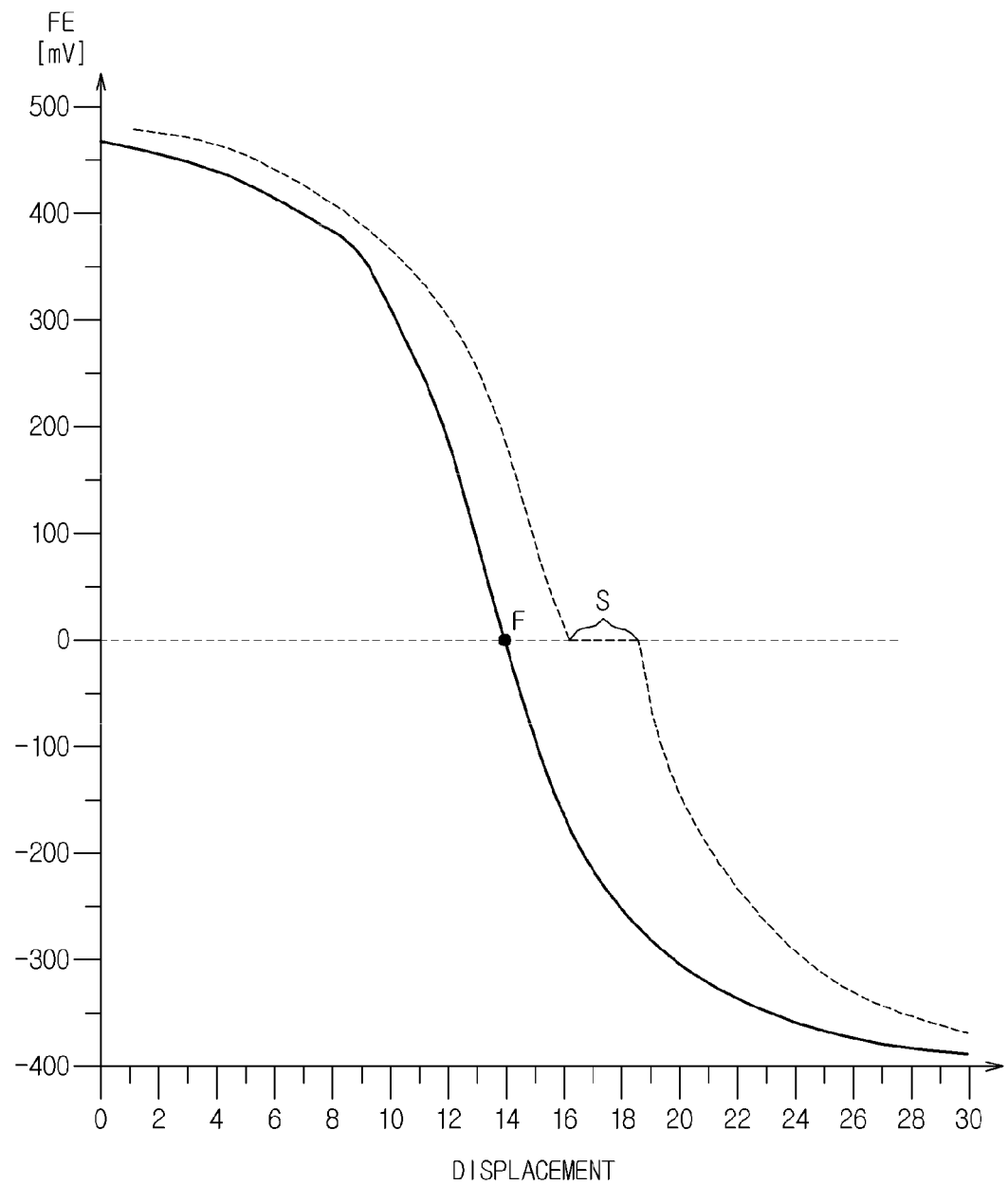
FIG. 6 is a graph illustrating a relationship between a focus error (FE) and a focal point displacement using light-amount detection signals from the light receiving units in the focus detection unit when measuring and testing a specimen made of transparent material.

FIG. 6 is a graph illustrating a relationship between a focus error (FE) and a focal point displacement using light-amount detection signals from the light receiving units in the focus detection unit when measuring and testing the specimen made of a transparent material.

As mentioned above, when measuring and testing the specimen 10 made of a transparent material, laser light reflects from upper and lower surfaces of the transparent specimen 10 and then both of the light beam reflected from the upper surface and the light beam reflected from the lower surface are incident on the first and second light receiving units 226 and 228, so that the two focal points of the laser light are formed and positioned between the first and second light receiving units 226 and 228. Therefore, there may occur a change in a signal waveform of a focus error FE calculated using amount (PD1) of reflected light detected by the first light receiving unit 226 and amount (PD2) of reflected light detected by the second light receiving unit 228.

In FIG. 6, a solid line indicates a signal waveform of a focus error FE obtained when measuring and testing the specimen 10 made of an opaque material, whereas a dotted line indicates a signal waveform of a focus error FE obtained when measuring and testing the specimen 10 made of a transparent material.

As shown in FIG. 6, when measuring and testing the specimen 10 made of an opaque material, there occurs only one point at which the focus error value is zero. Therefore, focus adjustment may be carried out by considering the point as a focal point so that the specimen may reach the point. However, when measuring and testing the specimen 10 made of a transparent material, there occurs an interval S at which the focus error value is zero. Therefore, it may be difficult to accurately carry out focus adjustment for this interval S by using only the amount (PD1) of reflected light detected by the first light receiving unit 226 and the amount (PD2) of reflected light detected by the second light receiving unit 228.

Accordingly, in some embodiments, the focusing device for the optical microscope using laser scanning further includes a confocal-type light receiving mechanism. In this way, when measuring and testing the specimen made of a transparent material and having a small thickness, it may be possible to carry out the focus adjustment by accurately moving the specimen and/or objective lens to achieve a focus match.

Figure 7:
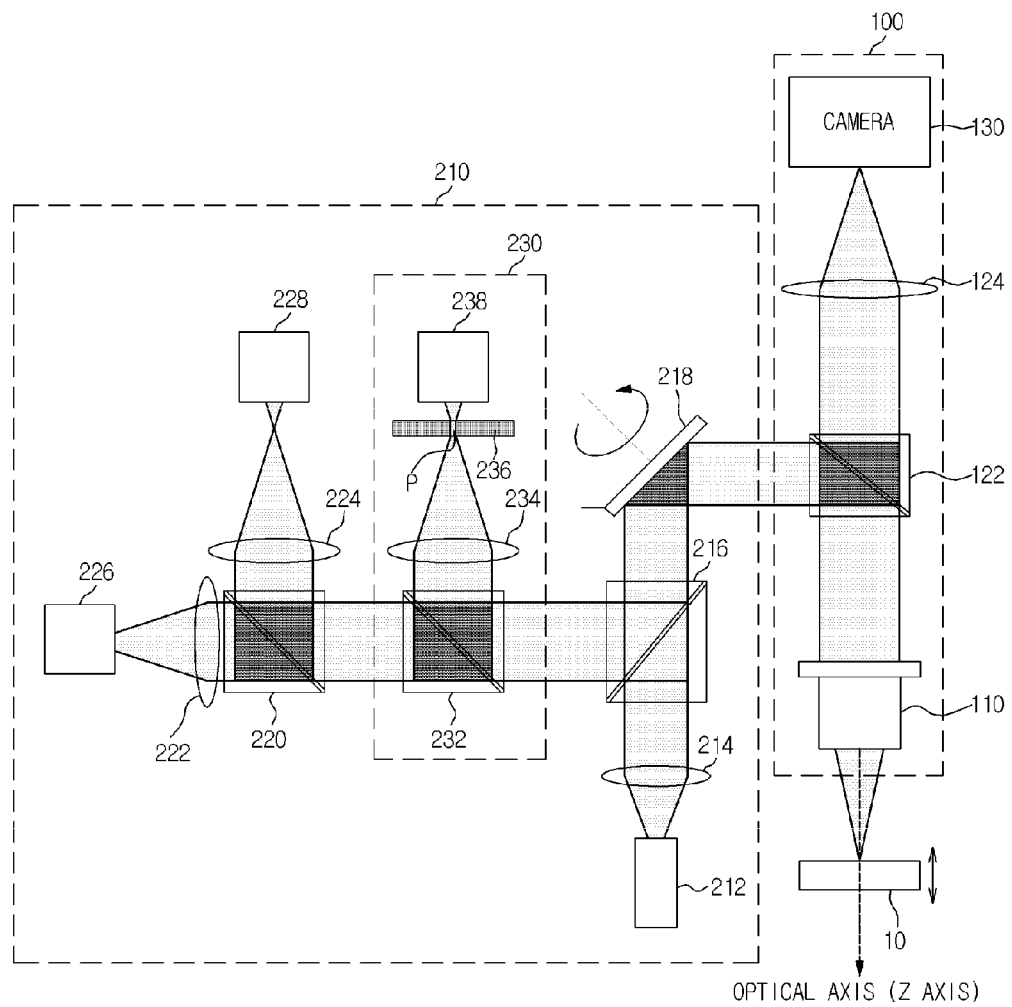
FIG. 7 illustrates an optical system configuration of a focus detection unit in a focusing device for an optical microscope according to some embodiments.
Figure 8:
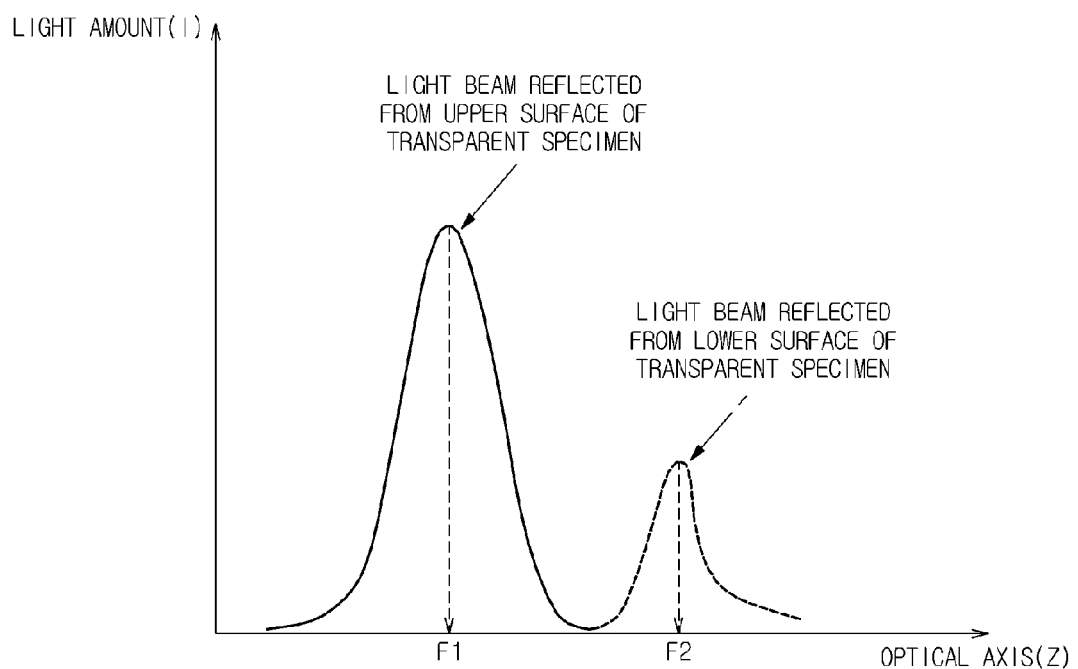
FIG. 8 is a graph illustrating a waveform of a light-amount detection signal obtained by a confocal-type light receiving unit when measuring and testing a specimen made of transparent material.

FIG. 7 illustrates an optical system configuration of a focus detection unit in a focusing device for an optical microscope according to some example embodiments. FIG. 8 is a graph illustrating a waveform of a light-amount detection signal obtained by the confocal-type light emitting mechanism when measuring and testing the specimen made of a transparent material.

As for the optical system configuration of the focus detection unit 210 in a focusing device for an optical microscope according to some example embodiments (e.g., FIG. 7), each of other components than the confocal-type light receiving mechanism may have the same configuration as in the optical system configuration of the focus detection unit in the focusing device for the optical microscope using laser scanning as shown in FIG. 1. Therefore, only a configuration of the confocal-type light receiving mechanism will be described in detail hereinafter.

As show in FIG. 7, the focus detection unit 210 in the focusing device for the optical microscope according to some example embodiments may further a spatial filter 230 between the half mirror 216 and light splitter 220. That is, a confocal-type light receiving mechanism is added to the focusing device for the optical microscope using laser scanning.

The spatial filter refers to a spatial pin hole and serves to eliminate a light beam reflected from positions other than a focal point.

The confocal-type light receiving mechanism may mean that the out-of-focus light beam reflected from the specimen 10 is eliminated from the reflected laser light beams and only the in-focus light reflected from the specimen 10 is used, so that the light beam reflected from the upper surface of the transparent specimen 10 and the light beam reflected from the lower surface of the transparent specimen 10 are separated from each other.

The spatial filter 230 may include a light splitter 232, a third condenser lens 234, a pin hole member 236 having a pin hole P formed therein, and/or a third light receiving unit 238.

The light splitter 232 transmits some of light reflected from the wedge mirror 218 and half mirror 216 and incident thereon so as to be incident on the light splitter 220. The light splitter 232 reflects the remainder of light reflected from the wedge mirror 218 and half mirror 216 and incident thereon so as to be incident on the third light receiving unit 238.

The third condenser lens 234 condenses light reflected from the light splitter 232 to the pin hole P so that only in-focus light is extracted.

The third light receiving unit 238 detects the amount of light incident thereon through the pin hole P. The third light receiving unit 238 may employ photo diodes (PD).

The confocal-type light receiving mechanism has a high sensitivity to a focal plane. Therefore, when laser scanning operation for the thin and transparent specimen is performed in an optical axis (Z axis) direction, a graph as shown in FIG. 8 may be obtained. Here, a position along the Z axis corresponding to a peak of a waveform of the light-amount detection signal from the third light receiving unit 238 as shown in FIG. 8 becomes a focal point.

When the specimen 10 is made of a transparent material, a waveform of the light-amount detection signal for light reflected from the upper surface of the specimen 10 (as indicated by a solid line in FIG. 8) and a waveform of the light-amount detection signal for light reflected from the lower surface of the specimen 10 (as indicated by a dotted line in FIG. 8) have single peaks respectively. Using an algorithm to locate positions of the peaks, focal points may be located.

When measuring and testing the specimen 10 made of a transparent material, both of light reflected from the upper surface of the specimen 10 and light reflected from the lower surface of the specimen 10 are incident on the first, second, and third light receiving units 226, 228, and 238. Therefore, for the purpose of an accurate focus adjustment, it should be determined in advance which one of the upper and lower surfaces of the specimen 10 will be referenced when carrying out the focus adjustment.

When carrying out focus adjustment using only the confocal-type mechanism instead of using a combination of laser scanning and confocal-type mechanism, the specimen 10 should be scanned along an entirety of the Z axis in order to locate the positions corresponding to the peaks of the light-amount detection signal. Moreover, when the specimen 10 is made of a transparent material, it is necessary to determine from which one of the upper and lower surfaces of the specimen 10 a light beam in question is reflected. For these reasons, when carrying out the focus adjustment using only the confocal-type mechanism, focus adjustment speed may be lower.

However, the focusing device for the optical microscope according to some example embodiments may use the combination of laser scanning and confocal-type mechanism. Therefore, the focusing device for the optical microscope according to some example embodiments may shorten the focus adjustment duration or improve the focus adjustment speed, compared to the case of carrying out focus adjustment using only the confocal-type mechanism.

When carrying out the focus adjustment by moving the specimen 10 in the Z axis direction using the focusing device for the optical microscope according to some example embodiments, in the focus mismatch situation in which the specimen 10 is not positioned at the focal point, it may be determined using a difference value (or focus error value) between amounts (PD1 and PD2) of reflected light detected by the first and second light receiving units 226 and 228 respectively whether to move the specimen 10 upwards or downwards to achieve the focus match. In this way, according to some example embodiments, the focus match of the optical microscope 100 may be achieved rapidly and accurately by moving the specimen 10 to the position in the optical axis corresponding to the peak of the waveform of the light-amount detection signal of light reflected from any selected one of the upper and lower surfaces of the specimen 10 using the confocal-type light receiving mechanism without the need to scan the specimen 10 along an entirety of the Z axis or optical axis.

Hereinafter, referring to FIG. 9, there will be described how to adjust a focus using the focusing device for the optical microscope according to some example embodiments.

Figure 9:
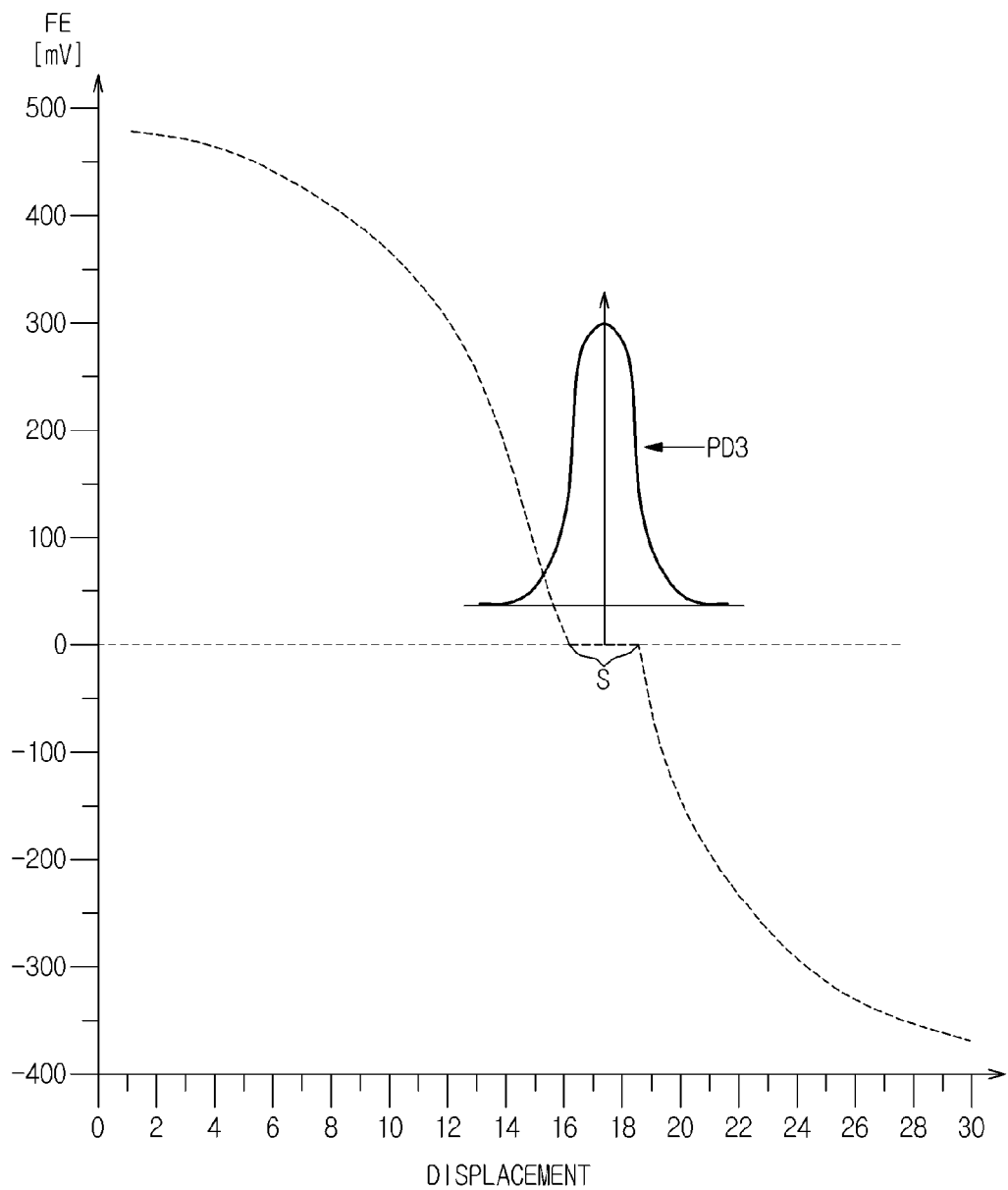
FIG. 9 is a graph illustrating how to adjust a focus using the focusing device for the optical microscope according to some example embodiments.

In accordance with this embodiment, when measuring and testing the thin specimen 10 made of the transparent material, the specimen 10 may be brought exactly to the focal point by using a signal waveform of the focus error value obtained when measuring and testing the specimen 10 made of the transparent material (as indicated by a dotted line in FIG. 9) and a waveform of the light-amount detection signal (amount (PD3) of reflected light detected by the third light receiving unit) from the confocal-type light receiving unit (as indicated by a solid line in FIG. 9).

To be specific, it is determined using the waveform of the focus error signal calculated from the amounts (PD1 and PD2) of reflected light detected by the first and second light receiving units 226 and 228 respectively (as indicated by a dotted line in FIG. 9) whether to move the specimen 10 upwards or downwards to achieve the focus match of the specimen 10. That is, the upward or downward movement of the specimen 10 is determined. Further, when the specimen reaches, while moving the specimen 10 in the determined direction, the position in the optical axis corresponding to the peak of the waveform of the light-amount detection signal (PD3) from the confocal-type light receiving unit (as indicated by a solid line in FIG. 9), the specimen 10 stops. That is, the focal point toward which the specimen 10 move is determined. In this way, the focus match of the optical microscope 100 is achieved.

At this time, when the amount (PD2) of reflected light detected by the second light receiving unit 228 is larger than the amount (PD1) of reflected light detected by the first light receiving unit 226, that is, the focus error (FE) value is greater than zero, a focus adjustment is carried out using the light-amount detection signal (PD3) from the third light receiving unit (328) while moving the specimen upwards. Conversely, when the amount (PD2) of reflected light detected by the second light receiving unit 228 is smaller than the amount (PD1) of reflected light detected by the first light receiving unit 226, that is, the focus error (FE) value is less than zero, focus adjustment is carried out using the light-amount detection signal (PD3) from the third light receiving unit (328) while moving the specimen downwards.

Figure 10:
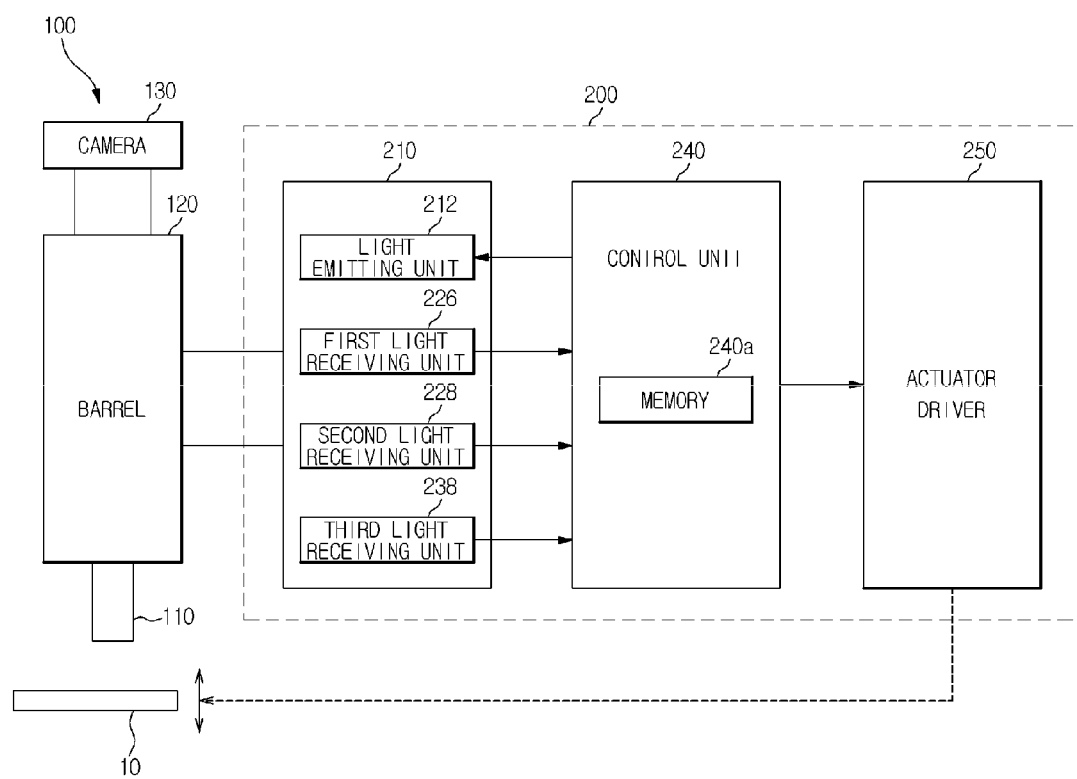
FIG. 10 is a block diagram of controlling a focusing device for an optical microscope according to some example embodiments.

FIG. 10 is a block diagram of controlling a focusing device for an optical microscope according to some example embodiments.

As shown in FIG. 10, the optical microscope 100 is constructed such that an objective lens 110 and barrel 120 are coupled to a camera 130. Within the barrel 120, there may be disposed the light splitter 122, the condenser lens 124, an illumination unit (not shown), etc. In order to focus on a configuration of a focusing device 200, the light splitter 122, the condenser lens 124, and the illumination unit are not shown in FIG. 10.

A focusing device 200 configured to adjust a focus of the optical microscope 100 may be connected to the optical microscope 100. Focusing device 200 may be configured to automatically adjust a focus of the optical microscope 100.

As shown in FIG. 10, the focusing device 200 of the optical microscope 100 according to some example embodiments may include a focus detection unit 210, a control unit 240, and/or an actuator driver 250.

The focus detection unit 210 detects a distance between the specimen 10 and the objective lens 110 and thus accurately locates the focal point. The focus detection unit 210 may include the light emitting unit 212 to emit laser light having a specific wavelength and/or the first, second, and third light receiving units 226, 228, and 238 to detect amounts of laser light emitted from the light emitting unit 212 and reaching and reflected from the specimen 10. Especially, the third light receiving unit 238 as the confocal-type light receiving unit receives only the in-focus light beam among laser light beams reaching and reflected from the specimen 10 while the out-of-focus light beam is eliminated from the laser light beams reaching and reflected from the specimen 10.

The control unit 240 controls operations of the focusing device 200. To this end, the control unit 240 receives a plurality of the light-amount information (PD1, PD2 and PD3) from the first, second, and third light receiving units 226, 228, and 238 in the focus detection unit 210 respectively and generates a control signal used to carry out focus adjustment using the received light-amount information (PD1, PD2 and PD3).

The control unit 240 sends the control signal to the light emitting unit 212 so that the light emitting unit 212 emits laser light having a specific wavelength.

The control unit 240 receives light-amount information (PD1 and PD2) from the first and second light receiving units 226 and 228 and calculates the focus error (FE) value using the received light-amount information (PD1 and PD2). The control unit 240 determines whether to move the specimen 10 upwards or downwards to archive the focus match, depending on whether the calculated focus error value is positive or negative. The control unit 240 receives the light-amount detection signal (PD3) from the confocal-type light receiving unit (i.e. the third light receiving unit (238)) while moving the specimen 10 in the determined direction. When the moving specimen 10 reaches the position in the optical axis corresponding to the peak of the waveform of the light-amount detection signal (PD3), the control unit stops the specimen 10. In this way, the focus match of the optical microscope 100 is achieved.

The control unit 240 generates a control signal used to carry out the focusing operation based on a plurality of the light-amount information (PD1, PD2 and PD3) received from the first, second, and third light receiving units 226, 228, and 238. The control signal may include information on the movement direction of the specimen 10 and timing when the specimen 10 stops. The control unit 240 sends this control signal to the actuator driver 250.

The control unit 240 may have a memory 240a therein. The memory may store initial setting information including a mathematical expression FE=(PD2−PD1)/(PD2+PD1) used to calculate the focus error (FE) value, and information on which one of the upper and lower surfaces of the specimen 10 will be referenced to carry out the focus adjustment when measuring and testing the specimen 10 made of a transparent material; and the plurality of the light-amount information (PD1, PD2 and PD3) received from the first, second, and third light receiving units 226, 228, and 238, etc.

In some example embodiments, the memory 240a to store the desired (or alternatively, predetermined) information necessary to carry out the focusing operation is provided within the control unit 240. However, example embodiments are not limited to storing the information in memory 240a. The desired (or alternatively, predetermined) information necessary to carry out the focusing operation may be stored in a separate storage unit instead of the internal type memory 240a.

The actuator driver 250 controls an operation of an actuator (not shown) such as a motor or a piezoelectric device or the like coupled to a support (not shown) on which the specimen 10 is mounted so as to move the specimen 10 in the optical axis (Z axis) direction in response to the control signal received from the control unit 240 so that the specimen 10 reaches the focal point determined by the control unit 240.

In some example embodiments, the specimen 10 moves in the optical axis (Z axis) direction to carry out the focus adjustment. However, example embodiments are not limited to the specimen moving by itself. Not the specimen 10 but the objective lens 110 moves in the optical axis (Z axis) direction to carry out focus adjustment. Otherwise, an entirety of the barrel 120 moves in the optical axis (Z axis) direction to carry out focus adjustment.

Figure 11:
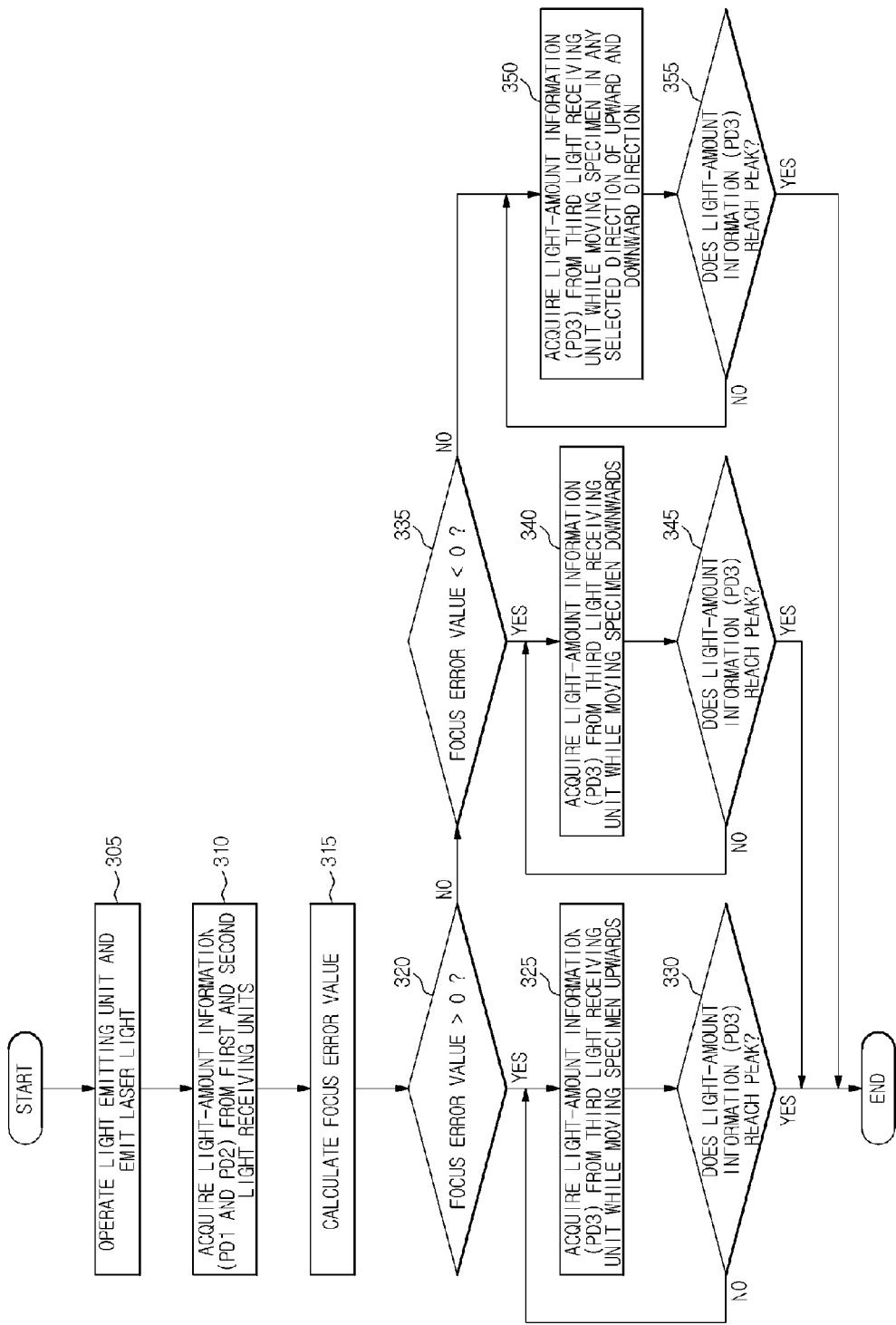
FIG. 11 is a flow chart of a focusing method using a focusing device for an optical microscope according to some example embodiments.

FIG. 11 is a flow-chart of a focusing method using a focusing device for an optical microscope according to some example embodiments.

It is assumed that as an initial condition to carry out a focusing operation in accordance with some example embodiments, there is stored in the memory 240a of the control unit 240 the initial setting information including the mathematical expression FE=(PD2−PD1)/(PD2+PD1) used to calculate the focus error (FE) value, and information on which one of the upper and lower surfaces of the specimen 10 will be referenced to carry out the focus adjustment when measuring and testing the specimen 10 made of a transparent material. Hereinafter, for the sake of convenience of explanation and understating, as one example, it is the specimen 10 that moves in the optical axis (Z axis) direction to carry out the focusing operation for the optical microscope 100. However, example embodiments are not limited to the specimen moving by itself. Instead of the specimen, the objective lens of the optical microscope or the entirety of the optical microscope may move in the optical axis direction.

When starting to measure and test the specimen 10, the control unit 240 sends the control signal to the light emitting unit 212 so that the light emitting unit 212 emits laser light having a specific wavelength (operation 305). Laser light emitted from the light emitting unit 212 reaches and is reflected from the surfaces of the specimen 10 and returns to the focus detection unit 210.

Thereafter, the control unit 240 receives, respectively, from the first and second light receiving units 226 and 228 the light-amount information (PD1 and PD2) of laser light reflected from the surfaces of the specimen 10 and incident on the first and second light receiving units 226 and 228 (operation 310). The light-amount information (PD1 and PD2) of laser light received from the first and second light receiving units 226 and 228 is stored in the memory 240a of the control unit 240.

Next, the control unit 240 calculates the focus error (FE) value using the light-amount information (PD1 and PD2) of laser light received from the first and second light receiving units 226 and 228 (operation 315). The focus error (FE) value is calculated by the mathematical expression $FE=(PD2-PD1)/(PD2+PD1)$.

Then, the control unit 240 determines whether the calculated focus error (FE) value is greater than zero (operation 320).

Upon being determined that the calculated focus error (FE) value is a positive value, that is, is greater than zero ("yes" in operation 320), the control unit 240 determines that the specimen 10 is located below the focal point and thus sends an associated control signal to the actuator driver 250 so that the actuator driver 250 moves the specimen 10 upwards. The control unit 240 then receives, while continuously moving the specimen 10 upwards, from the third light receiving unit 238 the light-amount information (PD3) of laser light reflected from the surfaces of the specimen 10 and incident on the third light receiving unit 238 (operation 325). The light-amount information (PD3) input from the third light receiving unit 238 is stored in the memory 240a of the control unit 240. The control unit 240 compares currently-input light-amount information (PD3) with a maximum value of previously-input light-amount information (PD3) and thus continuously updates the maximum value of light-amount information (PD3) and then stores the undated maximum value of light-amount information (PD3) in the memory 240a. At this time, the third light receiving unit 238 receives only the in-focus light beam among the laser light beams reaching and reflected from the specimen 10 while the out-of-focus light beam is eliminated from the laser light beams reaching and reflected from the specimen 10. The control unit 240 determines whether the light-amount information (PD3) of the in-focus laser light detected by the third light receiving unit 238 reaches the peak (operation 330).

Upon determining that the light-amount information (PD3) of the in-focus laser light detected by the third light receiving unit 238 reaches the peak ("yes" in operation 330), the control unit 240 determines that the moving specimen 10 reaches the focal point and then terminates the focusing operation. More specifically, when a result from subtracting currently-input light-amount information (PD3) from the maximum value of previously-input light-amount information (PD3) stored in the memory 240a is above a preset value, the control unit 240 determines that the specimen just passed by the peak of the waveform of the light-amount information (PD3) of light detected by the third light receiving unit 238 and is currently located at a falling point of the waveform. Accordingly, the control unit 240 moves the specimen 10 to the position in the optical axis corresponding to the peak of the waveform of the light-amount detection signal. In this way, the focus match of the optical microscope 100 is achieved.

On the contrary, upon determining that the light-amount information (PD3) of the in-focus laser light detected by the third light receiving unit 238 does not reach the peak ("no" in the operation 330), the process returns to operation 325 in which the control unit 240 receives, while continuously moving the specimen 10 upwards, from the third light receiving unit 238 the light-amount information (PD3) of reflected laser light.

On the other hand, upon determining in operation 320 that the calculated focus error (FE) value is not greater than zero, ("no" in operation 320), the control unit 240 determines whether the calculated focus error (FE) value is less than zero, that is, is a negative value (operation 335).

Upon determining that the calculated focus error (FE) value is less than zero ("yes" in operation 335), the control unit 240 determines that the specimen 10 is located above the focal point and thus sends an associated control signal to the actuator driver 250 so that the actuator driver 250 moves the specimen 10 downwards. Then, the control unit 240 receives, while continuously moving the specimen 10 downwards, from the third light receiving unit 238 as the confocal-type light receiving unit the light-amount information (PD3) of laser light reflected from the surfaces of the specimen 10 and incident on the third light receiving unit 238 (operation 340). The light-amount information (PD3) input from the third light receiving unit 238 is stored in the memory 240a of the control unit 240. The control unit 240 again determines whether the light-amount information (PD3) of the in-focus laser light detected by the third light receiving unit 238 reaches the peak (operation 345).

Upon determining that the light-amount information (PD3) of the in-focus laser light detected by the third light receiving unit 238 reaches the peak ("yes" in the operation 345), the control unit 240 determines that the moving specimen 10 reaches the focal point and then terminates the focusing operation.

On the contrary, upon being determined that the light-amount information (PD3) of the in-focus laser light detected by the third light receiving unit 238 does not reach the peak ("no" in the operation 345), the process returns to the operation 340 in which the control unit 240 receives, while continuously moving the specimen 10 downwards, from the third light receiving unit 238 the light-amount information (PD3) of reflected laser light.

On the other hand, upon being determined in the operation 335 that the calculated focus error (FE) value is not less than zero, that is, it is equal to zero ("no" in the operation 335), the control unit 240 may not determine whether the specimen 10 is located above or below the focal point. Therefore, the control unit 240 sends a control signal to the actuator driver 250 so that the specimen 10 moves in any selected one of the upward and downward directions. The control unit 240 receives, while continuously moving the specimen 10 in any selected one of the upward and downward directions, from the third light receiving unit 238 the light-amount information (PD3) of laser light reflected from the surfaces of the specimen 10 and incident on the third light receiving unit 238 (operation 350). Upon determining that the light-amount information (PD3) input from the third light receiving unit 238 gradually decrease when moving the specimen 10 in any selected one of the upward and downward directions, the control unit 240 determines that the specimen 10 becomes gradually farther away from the focal point. Thus, the control unit 240 sends a control signal to the actuator driver 250 so that the specimen 10 moves in an opposite direction to the selected one of the upward and downward directions. The control unit 240 receives, while continuously moving the specimen 10 in the opposite direction, from the third light receiving unit 238 the light-amount information (PD3) of laser light reflected from the surfaces of the specimen 10 and incident on the third light receiving unit 238.

Next, the control unit 240 again determines whether the light-amount information (PD3) of the in-focus laser light detected by the third light receiving unit 238 reaches the peak (operation 355).

Upon determining that the light-amount information (PD3) of the in-focus laser light detected by the third light receiving unit 238 reaches the peak ("yes" in the operation 355), the control unit 240 determines that the moving specimen 10 reaches the focal point and then terminates the focusing operation.

On the contrary, upon determining that the light-amount information (PD3) of the in-focus laser light detected by the third light receiving unit 238 does not reach the peak ("no" in the operation 355), the process returns to the operation 350 in which the control unit 240 receives, while continuously moving the specimen 10 in any selected one of the upward and downward directions, from the third light receiving unit 238, the light-amount information (PD3) of reflected laser light.

While example embodiments have been particularly shown and described, it will be understood by those of ordinary skill in the art that various changes in form and details may be made therein without departing from the spirit and scope of the present invention as defined by the following claims.

What is claimed is:

1. A focusing device for an optical microscope, the focusing device comprising:
   a light emitting unit configured to emit laser light having a specific wavelength;
   a wedge mirror configured to enable the emitted laser light to be incident on a plurality of locations of a surface of a specimen;
   first and second light receiving units configured to detect an amount of laser light reflected from the surface of the specimen;
   a spatial filter configured to eliminate out-of-focus light from light beams reflected from the surface of the specimen and to detect an amount of in-focus light; and
   a control unit configured to generate a control signal used to carry out focus adjustment of the optical microscope using a plurality of light-amount information detected by the first and second light receiving units and the spatial filter.

2. The focusing device of claim 1, wherein the spatial filter comprises:
   a light splitter configured to transmit some light reflected from the surface of the specimen and to reflect a remainder of the light reflected from the surface of the specimen;
   a pin hole member having a pin hole formed in the pin hole member;
   a condenser lens on an optical path between the light splitter and the pin hole member, the condenser lens configured to condense the light reflected from the light splitter to the pin hole so that the in-focus light is extracted; and
   a third light receiving unit configured to detect an amount of light incident on the third light receiving unit through the pin hole.

3. The focusing device of claim 1, wherein the light emitting unit comprises a laser diode.

4. The focusing device of claim 1, further comprising:
   a collimating lens configured to enable beams of light emitted from the light emitting unit to be parallel to each other.

5. The focusing device of claim 4, further comprising:
   a half mirror between the wedge mirror and the collimating lens;
   wherein the half mirror is configured to,
      transmit some light passing through the collimating lens and incident on the half mirror;
      transmit some light reflected from the wedge mirror and incident on the half mirror;
      reflect a remainder of the light passing through the collimating lens and incident on the half mirror; and
      reflect a remainder of the light reflected from the wedge mirror and incident on the half mirror.

6. The focusing device of claim 2, wherein each of the first, second, and third light receiving units comprises a photodiode.

7. The focusing device of claim 2, wherein the control unit is configured to carry out focus adjustment of the optical microscope by moving the specimen, or an objective lens of the optical microscope, or an entirety of the optical microscope in an optical axis direction.

8. The focusing device of claim 7, further comprising:
   an actuator driver configured to receive the control signal from the control unit and to control, in response to the control signal, an operation of an actuator coupled to the specimen, or the objective lens, or a body of the optical microscope so as to move the specimen, or the objective lens of the optical microscope, or the entirety of the optical microscope in the optical axis direction.

9. The focusing device of claim 7, wherein the control unit is configured to calculate a focus error (FE) value using light-amount information (PD1) detected by the first light receiving unit, light-amount information (PD2) detected by the second light receiving unit, and a mathematical expression FE=(PD2−PD1)/(PD2+PD1), and
   wherein the control unit is configured to determine a movement direction of the specimen, or the objective lens, or the entirety of the optical microscope to achieve a focus match based on the calculated focus error value.

10. The focusing device of claim 9, wherein the control unit is configured to receive light-amount information from the third light receiving unit while moving the specimen, or the objective lens, or the entirety of the optical microscope in the determined movement direction, and
   wherein when the specimen, the objective lens, or the entirety of the optical microscope reaches a position in the optical axis direction corresponding to a peak of the light-amount information received from the third light receiving unit, the control unit is configured to stop the specimen, the objective lens, or the entirety of the optical microscope.

* * * * *